A. J. MEIER & W. L. SULLIVAN.
TICKET VENDING AND REGISTERING MACHINE.
APPLICATION FILED JULY 24, 1911.

1,039,167.

Patented Sept. 24, 1912.
8 SHEETS—SHEET 1.

A. J. MEIER & W. L. SULLIVAN.
TICKET VENDING AND REGISTERING MACHINE.
APPLICATION FILED JULY 24, 1911.
1,039,167.
Patented Sept. 24, 1912.
8 SHEETS—SHEET 2.
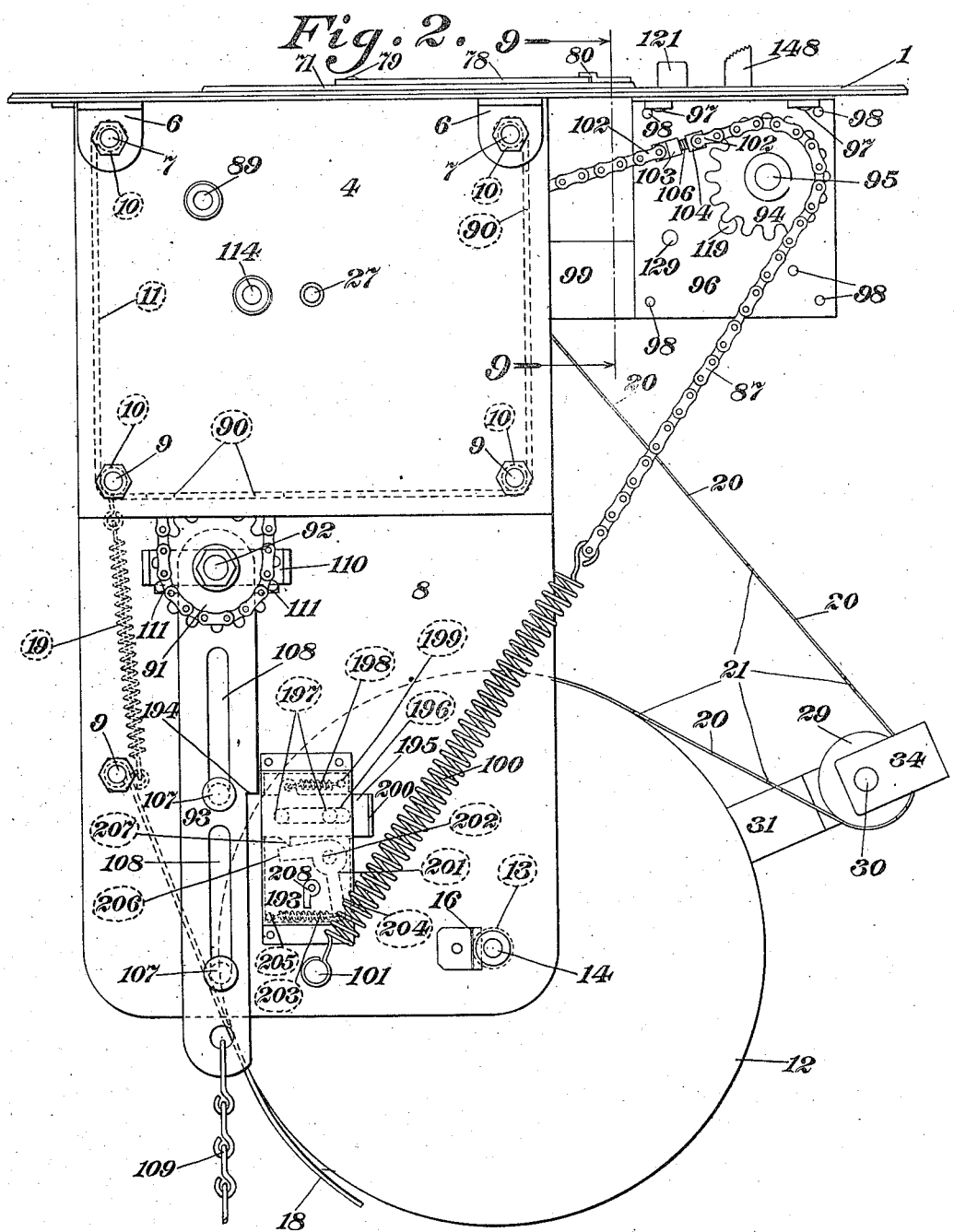

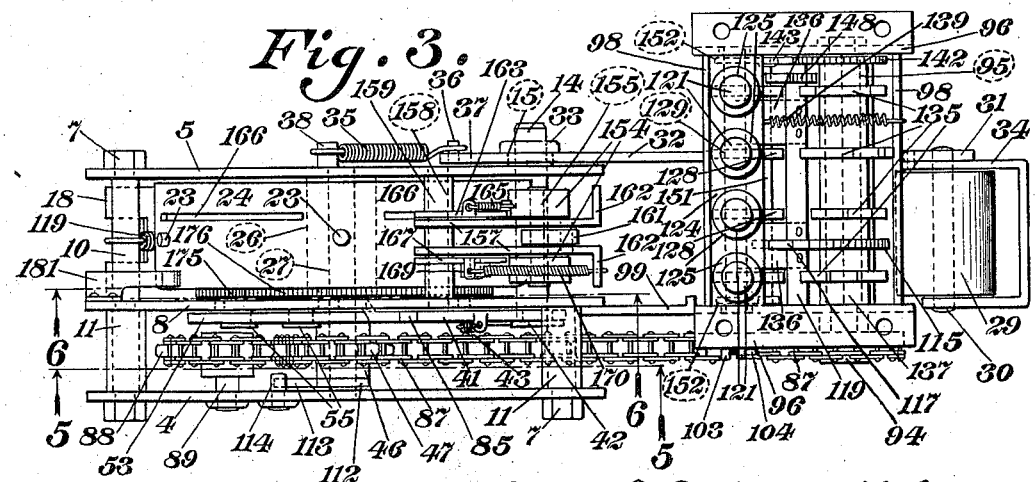

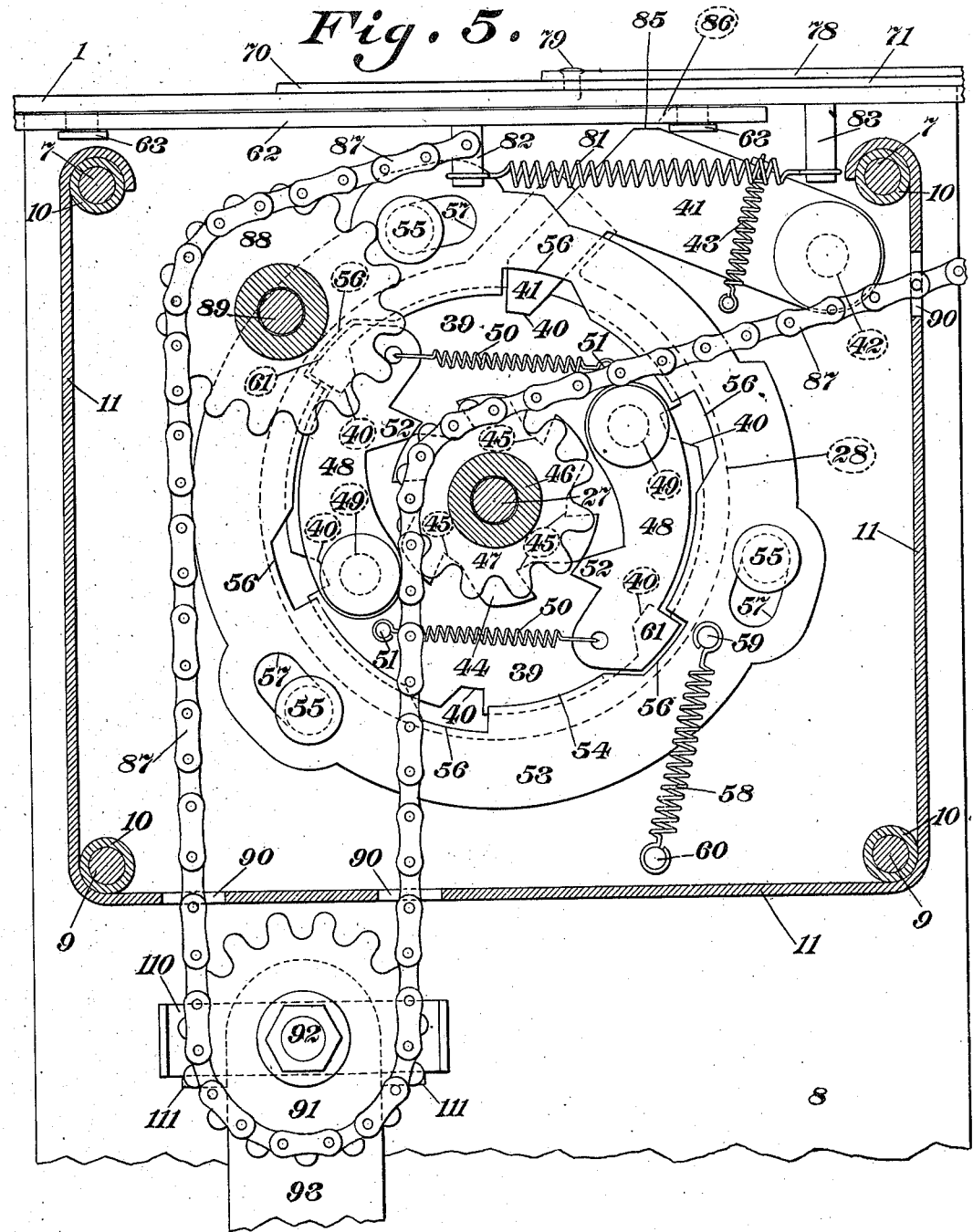

A. J. MEIER & W. L. SULLIVAN.
TICKET VENDING AND REGISTERING MACHINE.
APPLICATION FILED JULY 24, 1911.
1,039,167.
Patented Sept. 24, 1912.
8 SHEETS—SHEET 5.
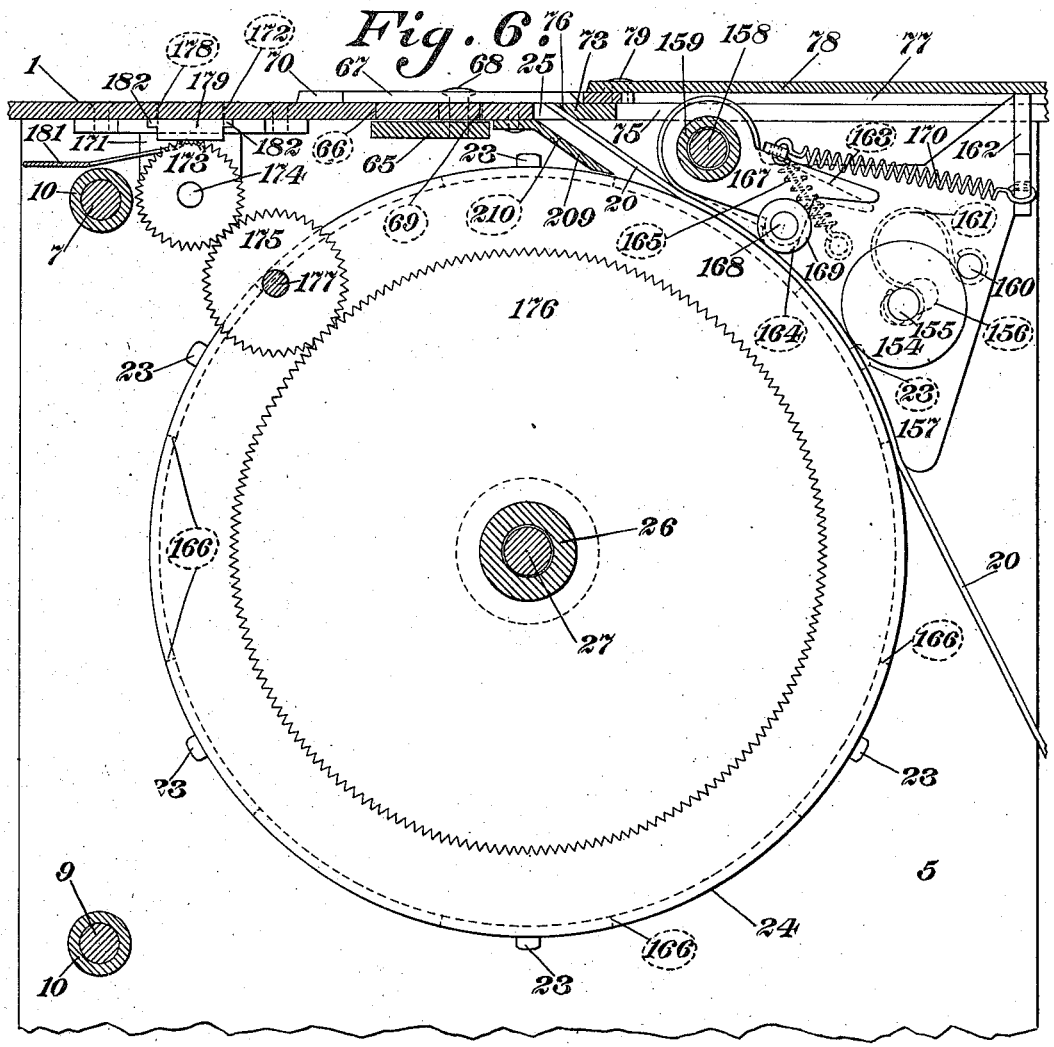
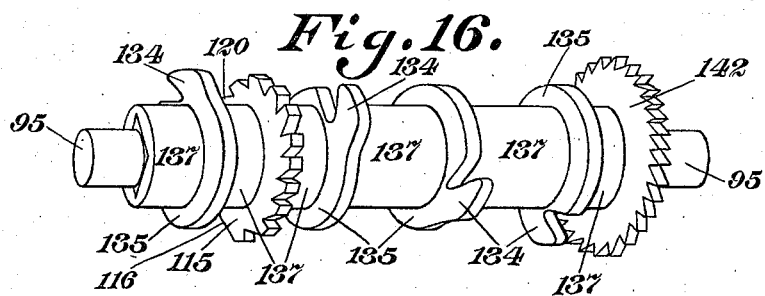
Witnesses:
George G. Anderson.
Bertha von Behrens.
Inventors:
Albert J. Meier and
William L. Sullivan,
By Hugh K. Wagner
Their Attorney.

A. J. MEIER & W. L. SULLIVAN.
TICKET VENDING AND REGISTERING MACHINE.
APPLICATION FILED JULY 24, 1911.

1,039,167.

Patented Sept. 24, 1912.

8 SHEETS—SHEET 6.

Witnesses:
George G. Anderson.
Bertha von Behrens.

Inventors:
Albert J. Meier
William L. Sullivan,
By Hugh N. Wagner
Their Attorney.

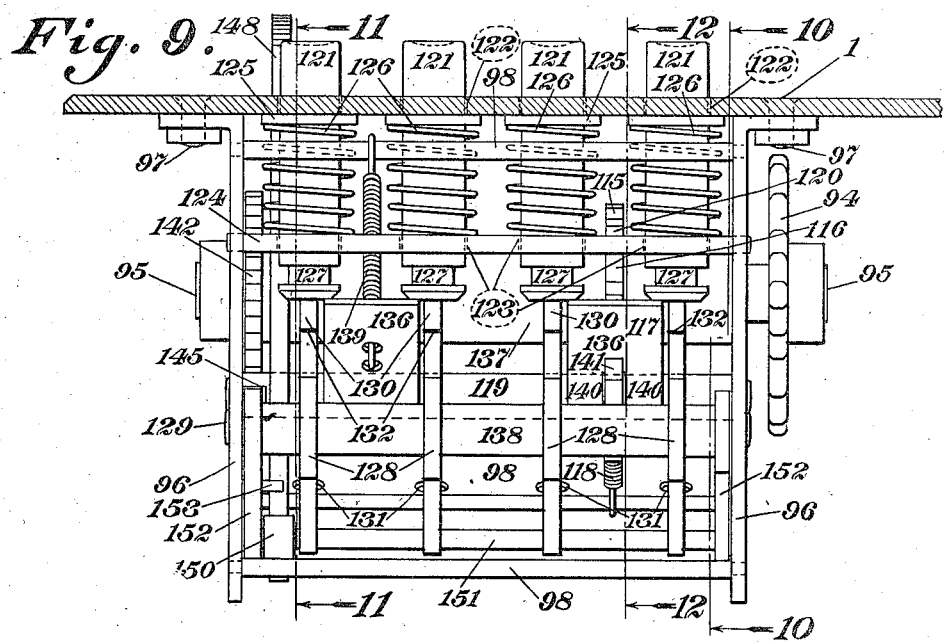

UNITED STATES PATENT OFFICE.

ALBERT J. MEIER, OF GLENDALE, AND WILLIAM L. SULLIVAN, OF ST. LOUIS, MISSOURI, ASSIGNORS TO THE TEMCO MANUFACTURING COMPANY, OF ST. LOUIS, MISSOURI, A CORPORATION OF MISSOURI.

TICKET VENDING AND REGISTERING MACHINE.

1,039,167.  Specification of Letters Patent.  Patented Sept. 24, 1912.

Application filed July 24, 1911. Serial No. 640,218.

To all whom it may concern:

Be it known that we, ALBERT J. MEIER and WILLIAM L. SULLIVAN, citizens of the United States, said ALBERT J. MEIER residing at Glendale, in the county of St. Louis, State of Missouri, and said WILLIAM L. SULLIVAN residing at the city of St. Louis and State of Missouri, have invented certain new and useful Improvements in Ticket Vending and Registering Machines, of which the following is a specification.

This invention relates to ticket vending and registering machines and has for its primary object to provide novel mechanism to be installed in box offices of theaters, baseball grounds, parks, and the like and, also, in ticket offices of elevated, subway, and other railways and the like for issuing and registering tickets, or the like.

Another object of this invention consists in the provision of means for issuing either a single or a plurality of tickets and registering same.

A further object of the present invention resides in the provision of means for severing the issued ticket or tickets from the strip of tickets within the machine.

A further object of this invention consists in the provision of means for locking the issuing mechanism from operation when the last ticket of the strip is issued from the machine.

Further, this invention consists in the novel features of construction and arrangement of parts as hereinafter more fully described and pointed out in the claims.

Figure 1:
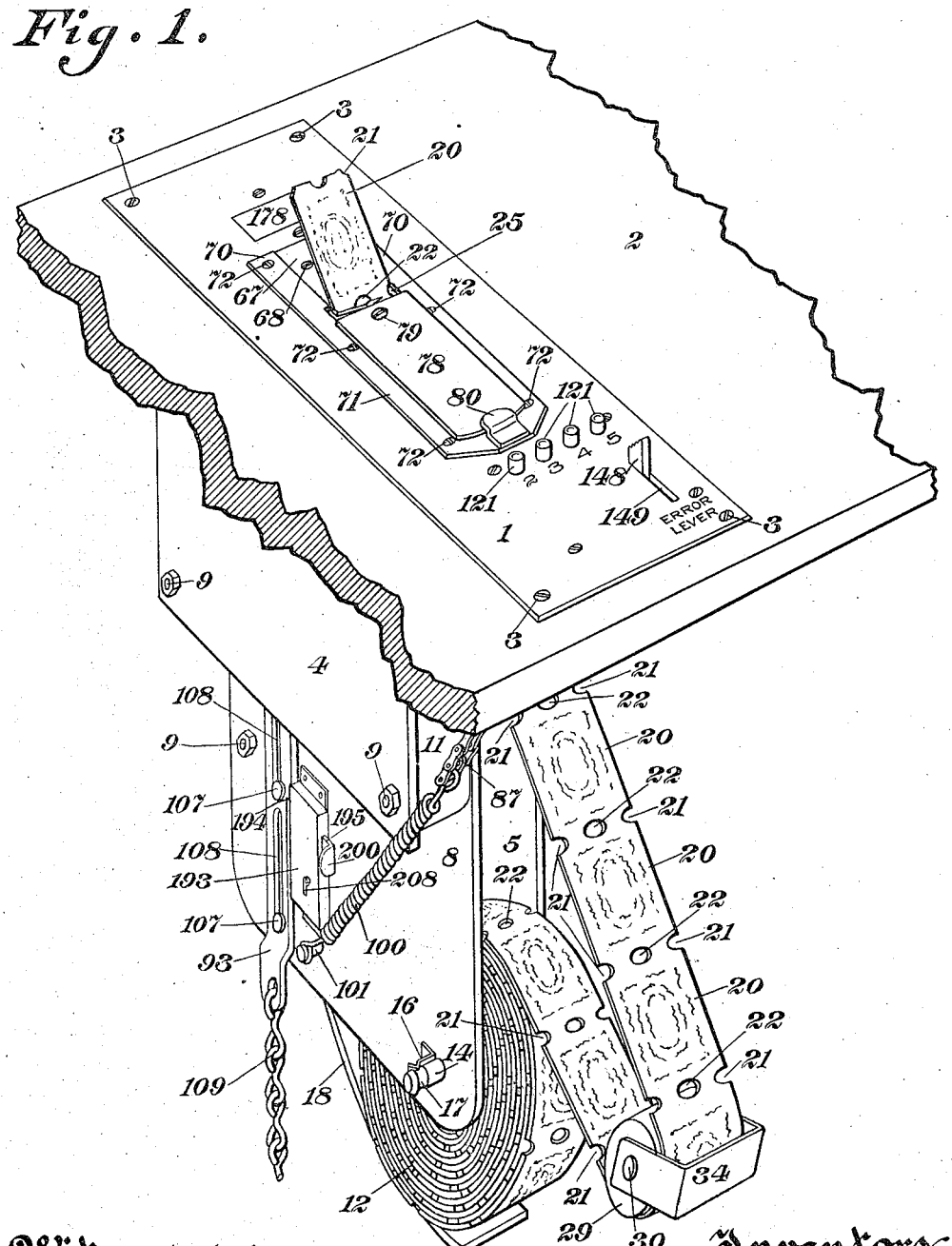
Figure 7:
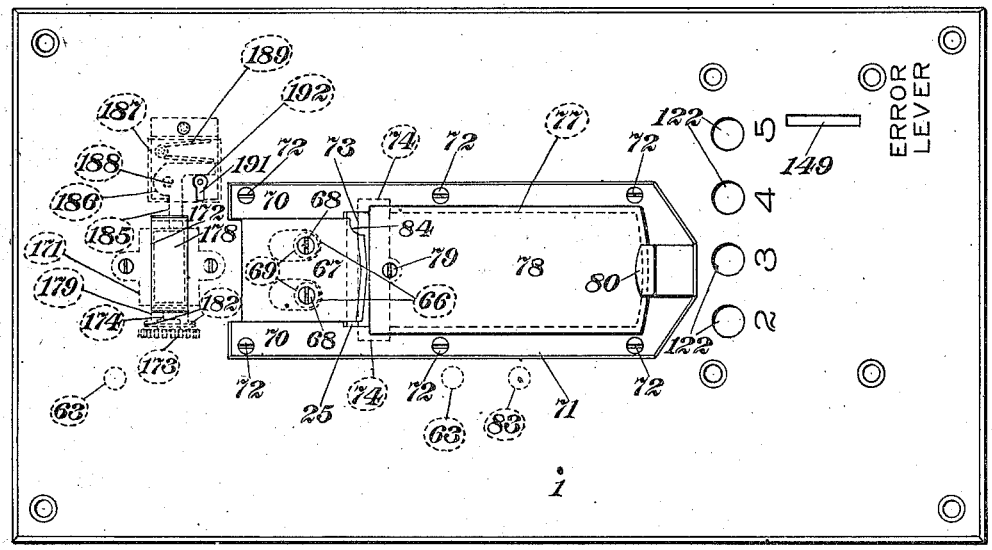
Figure 8:
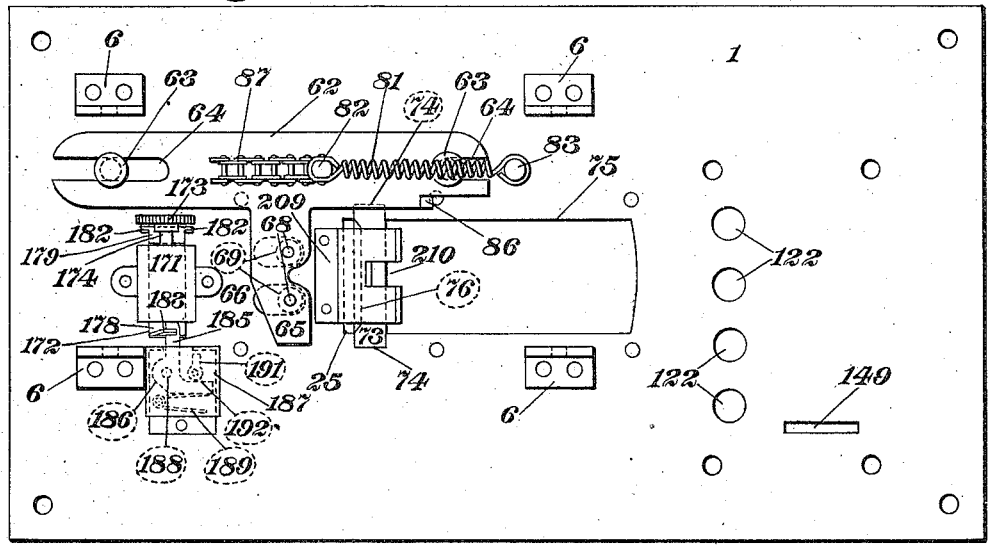
Figure 12:
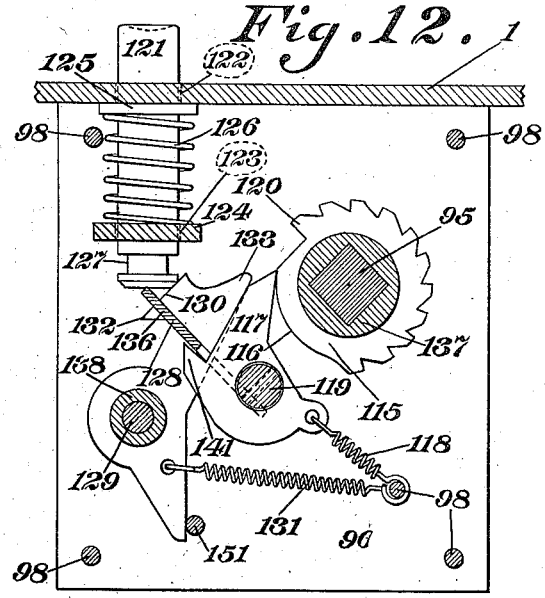
Figure 13:
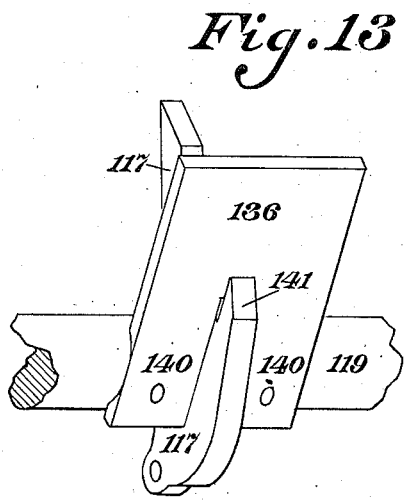
Figure 14:
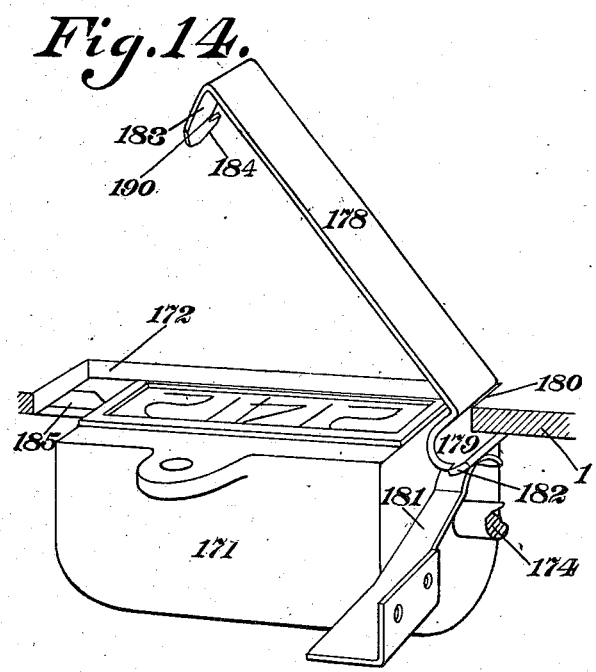
Figure 15:
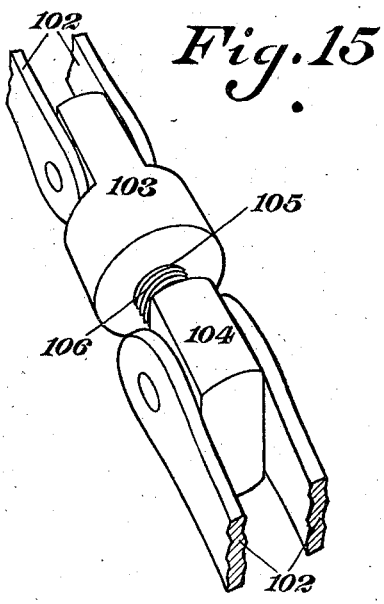

In the accompanying drawings forming part of this specification, in which like numbers of reference denote like parts wherever they occur, Figure 1 is a perspective view of part of a ticket counter with a ticket vending and registering machine embodying this invention attached thereto; Fig. 2 is a side elevation of the machine; Fig. 3 is a top plan view of the machine with the top plate removed to expose some of the internal mechanism. Fig. 4 is a side elevation of the lower part of the machine; Fig. 5 is a sectional view, on an enlarged scale, on the line 5—5, Fig. 3; Fig. 6 is a sectional view, on an enlarged scale, on the line 6—6, Fig. 3; Figs. 7 and 8 are top and bottom plan views, respectively, of the top plate; Fig. 9 is a sectional view, on an enlarged scale, on the line 9—9, Fig. 2; Fig. 10 is a sectional view on the line 10—10, Fig. 9; Fig. 11 is a sectional view on the line 11—11, Fig. 9; Fig. 12 is a sectional view on the line 12—12, Fig. 9; Fig. 13 is a perspective view, on an enlarged scale, of the pawl for limiting the travel of the operating chain; Fig. 14 is a perspective view, on an enlarged scale, of the registering machine and the cover therefor; Fig. 15 is a perspective view, on an enlarged scale, of the chain-adjusting device; and Fig. 16 is a perspective view, on an enlarged scale, of the shaft with the plates for limiting the rotation of same mounted thereon.

The top plate 1 of the machine may be supported in any suitable manner by the counter 2 of a ticket office and may be secured thereto by screws 3 or other suitable means. Side plates 4 and 5 depend from hangers 6, which are riveted or otherwise secured to the under side of the top plate 1, and extend through an opening in the counter 2, being secured to said hangers by means of bolts 7, or the like. The side plate 4 is relatively shorter than the side plate 5, and a division plate 8, which is located between said side plates, is preferably formed with substantially the same size and configuration as the side plate 5. The division plate 8 divides the machine into two compartments and is connected to the side plates 4 and 5 by bolts 9 that pass through space-sleeves 10, in order to hold said division plate in its proper position. The bolts 7 that secure the side plate 4 to the hangers 6 adjacent thereto connect said side plate 4 and division plate 8 and extend through space-sleeves 10 that hold said plates in spaced relation. The compartment between the side plate 4 and division plate 8 has its sides and bottom closed by a band 11, so as to prevent access to the moving parts within same.

A ticket roll 12, which is wound on a hollow core 13, is located between the side plate 5 and division plate 8 and is rotatably mounted on a pin 14 that extends through an opening in plate 8 and, also, through the opening in a hollow stud 15 secured in an opening in plate 5. A leaf spring 16 that is riveted or otherwise secured to plate 8 is arranged so as to seat in an annular groove 17 in pin 14 and thereby holds said pin in place. By pressing against either end of pin 14 same can be removed, in order to mount thereon a fresh ticket roll. A plate 18, which may be pivotally attached to a space-sleeve 10 on one of the bolts 9, is held in engagement with the ticket roll 12 by means of a spring 19, and affords a brake for the ticket roll, so as to prevent same from unwinding too freely.

The roll 12 consists of a continuous strip of paper, or the like, having the separate tickets 20 printed either on one or both sides thereof so that, when the machine issues a ticket or tickets, same will bear the customary subject-matter. The strip of paper has the usual notches 21 in both edges thereof at the junction of each two adjoining tickets, and, in addition thereto, a perforation 22 is formed in the junction of each two adjoining tickets, as best seen in Fig. 1. The perforations 22 permit the pins or projections 23 on the drum 24 to enter same for the purpose of feeding a ticket 20 or a plurality of said tickets through the opening 25 in the top plate 1, as hereinafter described, said pins being arranged in annular alinement and being spaced apart with substantially the same spacing as said perforations. The drum 24 is preferably somewhat bell-shaped and is located between the division plate 8 and the side plate 5, being secured to a hollow member or hub 26 that is revolubly mounted on a shaft 27. The shaft 27 extends from the side plate 4 to side plate 5 and passes through an opening 28 in the division plate 8, the ends of same being secured in openings in said side plates. The loose end of the strip of tickets that extends from the roll 12 passes underneath a roller 29 that is revolubly mounted on a pin 30 borne by the arm 31 of a bell-crank 32 and then passes over the drum 24, so that the pins 23 enter the perforations 22 between the tickets 20, said bell-crank being rotatably mounted on the stud 15 and being held in place thereon by a flange 33 borne by said stud. The pin 30 extends through openings in the ends of a U-shaped strap 34, which partly encircles the roller 29, and one end of said strap is riveted or otherwise secured to an arm of said bell-crank. Said strap protects the strip of tickets on roller 29 and prevents same from slipping off said roller. A spring 35, which is secured to a stud 36 on the arm 37 of bell-crank 32 and, also, to a stud 38 on plate 5, tends to hold the arm 37 of said bell-crank in alinement with the spring 35. When the drum 24 is rotated to feed a ticket or tickets 20 through the opening 25 in plate 1, as hereinafter described, the pull on the strip of tickets tends to rotate the bell-crank 32 in a clockwise direction, Fig. 4, but the pull of spring 35 tends to prevent such rotation of said bell-crank, with the result that the roller 29 holds the strip of tickets taut between the roll 12 and the drum 24.

A ratchet-wheel 39 having notches 40 in the periphery thereof is rigidly mounted on the hub 26 of drum 24 and is preferably disposed in the same plane with the division plate 8, being located in the opening 28 in said division plate. Said ratchet-wheel 39 moves with drum 24 and serves as a locking or locating plate, as hereinafter described. A pawl 41 is pivoted at 42 to the division plate 8, and the end of same extends through a notch in the edge of opening 28 in plate 8, in order to seat in a notch 40 in ratchet-wheel 39, being induced to enter said notch 40 by means of a spring 43. The pawl 41 prevents retrogression of ratchet-wheel 39, but allows said ratchet-wheel to be rotated forwardly, i. e., counter-clockwise Fig. 5, as hereinafter described. The notches 40 in ratchet-wheel 39 are predeterminedly and accurately spaced, so that each time the ratchet-wheel 39 is rotated sufficiently to feed a ticket 20 through opening 25 in plate 1, the pawl 41 rides out of a notch 40 and enters the next notch 40. A ratchet-wheel 44 having notches 45 in its periphery is rotatably mounted on shaft 27 and is secured to the hub 46 of a sprocket wheel 47 that is, also, rotatably mounted on said shaft, and, when said sprocket wheel 47 is rotated in the manner hereinafter described, said ratchet-wheel 44 rotates therewith. Said ratchet-wheel 44 is relatively smaller in diameter than the ratchet-wheel 39 and is located close to one side of same. The ratchet-wheel 39 has a pawl 48 or a plurality of such pawls pivotally attached thereto, a pair of said pawls being preferable. Each pawl 48 is pivoted at 49 to ratchet-wheel 39, and the free end of said pawl has an end of a spring 50 attached thereto, the other end of said spring being fastened to a pin or projection 51 borne by ratchet-wheel 39. Said pawl 48 is arranged so that normally its nose 52 rests against the periphery of ratchet-wheel 44 and, also, a little in advance of a notch 45, and, when the ratchet-wheel 44 is rotated forwardly, i. e., counter-clockwise, Fig. 5, until said notch comes opposite the nose 52 of pawl 48, the pull of spring 50 not only causes the nose 52 of said pawl to enter said notch, but holds same therein during the rest of the forward movement of said ratchet-wheel 44, with the result that ratchet-wheel 39 rotates forwardly with ratchet-wheel 44 and thereby causes the drum 24 to rotate forwardly, in order to feed a ticket or tickets 20 through the opening 25 in plate 1, but when the ratchet-wheel 44 is rotated rearwardly to its normal position, the ratchet-wheel 39 remains at rest by reason of pawl 41 seating in a notch 40 in same, as hereinabove described, and the nose 52 of pawl 40 rides out of said notch 45 so as to allow said ratchet-wheel to return to its initial position. When the ratchet-wheel 44 reaches its normal position, the nose 52 of pawl 48 occupies a position in advance of another notch 45, in order to be in position to enter same, when said ratchet-wheel 44 is again rotated forwardly. The notches 45 in ratchet-wheel 44 are preferably equal in number to the notches 40 in ratchet-wheel 39 and are predeterminedly and accurately spaced apart so that, when said ratchet-wheel 44 is returning to its initial position after same is rotated forwardly to cause a ticket or tickets 20 to pass through the opening 25 in plate 1, as just described, the nose 52 of pawl 48 rides out of a notch 45 and allows the same number of such notches following same to pass said nose as the number of tickets that passed through said opening as the result of the forward movement of said ratchet-wheel 44.

A plate 53 having an opening 54 therein is attached to the division plate 8 by means of studs 55, or the like, and is disposed in substantially the same plane with the pawls 48, said opening being preferably circular and having notches 56 in the edge thereof. Said plate is arranged so that the opening 54 is concentric to the shaft 27 and contains arcuate slots 57 through which the studs 55 extend, said slots being, also, concentric to shaft 27. A spring 58 is attached at one end thereof to a pin or projection 59 borne by plate 53 and at the other end to a pin or projection 60 borne by division plate 8, and tends to rotate said plate 53 in a clockwise direction, Fig. 5. The studs 55 limit such rotation of plate 53 and thereby hold same normally in position to allow the shoulder 61 on the back of each pawl 48 to seat in a notch 56 in said plate 53. When the ratchet-wheel 44 is rotated forwardly and the nose 52 on each pawl 48 is drawn into a notch 45 in said ratchet-wheel, as hereinabove described, the shoulder 61 on said pawl 48 moves out of a notch 56 in plate 53, so as to allow said pawl to travel forwardly with said ratchet-wheel. The shoulder 61 on said pawl moves close to the plate 53 during the forward movement of ratchet-wheel 44, with the result that said plate prevents the nose 52 on said pawl from moving out of a notch 45 in said ratchet-wheel, and, when the ratchet-wheel 44 reaches the limit of its forward movement, the pawl 48 stops in position to allow its shoulder 61 to enter a notch 56 in advance of the particular notch 56 from which said shoulder was withdrawn previous to being moved forwardly. When the ratchet-wheel 44 is rotated rearwardly to its initial position, the pawl 48 remains in the position to which same was moved by the forward movement of said ratchet-wheel, and, when said ratchet-wheel reaches its normal position, the nose 52 of said pawl rests against the periphery of said ratchet-wheel in advance of a notch 45 in same, and the shoulder 61 seats in the notch 56 adjacent thereto. The notches 56 in plate 53 are preferably equal in number to the notches 45 in ratchet-wheel 44 and are predeterminedly and accurately spaced apart so that, when the pawl 48 travels forwardly with ratchet-wheel 44 and thereby rotates the drum 24 sufficiently to feed a ticket or tickets 20 through the opening 25 in top plate 1, said ratchet-wheel moves said pawl to a position to allow the shoulder 61 on same to enter a notch 56 that is as many notches in advance of the particular notch 56 from which said shoulder was withdrawn previous to being moved forwardly as the number of tickets that passed through the opening 25 in plate 1 in consequence of the forward movement of said ratchet-wheel. In case the nose 52 of a pawl 48 fails to enter a notch 45 in ratchet-wheel 44 sufficiently to withdraw the shoulder 61 entirely from a notch 56 in plate 53, the plate 53 rotates in a counter-clockwise direction, Fig. 5, with said ratchet-wheel against the pull of spring 58, but the studs 55 limit such rotation before said ratchet-wheel rotates sufficiently to cause a ticket 20 to pass through the opening 25 in top plate 1. By this arrangement, the ratchet-wheel 44 is prevented from being rotated forwardly sufficiently to feed a ticket 20 through opening 25 in plate 1, until the shoulder 61 on pawl 48 has been entirely withdrawn from a notch 56 in plate 53.

A plate 62 is located above the pawl 41 and is supported by studs 63 that are secured to the under side of top plate 1. Said plate 62 lies close to the under side of the top plate 1 and contains elongated notches 64, or the like, through which the studs 63 extend, so as to allow same to be reciprocated and, also, to guide the movement of same. An arm 65 borne by plate 62 extends beneath slots 66 in top plate 1 and is secured to a knife 67 by means of screws 68, or the like, that pass through space-sleeves 69 in said slots, so that, when said plate 62 is reciprocated in the manner hereinafter described, said knife moves with same. The knife 67 rests on the upper side of plate 1 and normally closes the opening 25 in said plate, being located between the arms 70 of the bifurcated end of a plate 71, which is fastened to the upper side of plate 1 by screws 72 or other suitable means, so that said arms guide the movement of said knife. A plate 73, having its ends secured in notches 74 in the sides of an opening 75 in top plate 1 so that the upper surface thereof registers in substantially the same plane with the upper surface of plate 1, forms one side of opening 25 and has a beveled edge 76, which acts as the shear against which the cutting edge of the knife 67 presses the strip of tickets 20 to sever a ticket or tickets from the roll. The plate 71 contains an opening 77 which registers with opening 75 in plate 1 so as to afford access to the drum 24 when it is desired to place a strip of tickets 20 from a fresh roll 12 upon said drum, said opening 77 being closed by a cover 78 that is pivoted at 79 to plate 71. Said plate 71 bears a lip 80 that overlaps the free end of cover 78 when said cover is in position to close the opening 77. A spring 81 is attached at one end to a pin 82 borne by plate 62 and at the other end to a pin 83 borne by plate 1, and tends to pull the plate 62 toward the rear of the machine, but the studs 63 limit such movement of plate 62 so that normally the plate 62 holds the knife 67 in position to close the opening 25.

When the plate 62 is moved toward the front of the machine, the knife 67 moves away from the opening 25, in order to allow a ticket or tickets 20 to be fed through said opening, and then the strip of tickets is fed so as to cause a ticket or tickets 20 to pass through said opening, as hereinabove described, after which the plate is allowed to return to its initial position by the pull of spring 81, as hereinafter described, with the result that the cutting edge of knife 67 presses the strip of tickets against the beveled edge 76 of plate 73 and thereby severs the ticket or tickets 20 from the roll 12. A cut-away part 84 in the cutting edge of knife 67 leaves an uncut part, as illustrated in Fig. 1, that holds the issued ticket or tickets 20 until removed by the hand of the purchaser, so as to prevent said ticket or tickets from dropping on the floor or being blown away by the wind. A beveled corner 85 on pawl 41 fits close to the lower surface of plate 62 when said plate occupies its normal position, whereby said plate holds the nose of said pawl 41 in a notch 40 in ratchet-wheel 39 until after the plate 62 has been moved toward the front of the machine sufficiently to move the knife 67 away from opening 25, as hereinabove described. A cut-away part 86 in the plate 62 allows the corner 85 of pawl 41 to enter same, after the plate 62 reaches the limit of its forward movement, in order to allow the ratchet-wheel 39 to be rotated forwardly for the purpose of feeding a ticket or tickets 20 through the opening 25 in plate 1. By this arrangement, the ratchet-wheel 39 is locked from rotation during the forward movement of plate 62 and knife 67, so as to prevent the drum 24 from feeding a ticket or tickets 20 through opening 25 in plate 1 until after the knife has been moved away from said opening.

A chain 87 is attached at one end thereof to pin 82 borne by plate 62 and is arranged to extend from said pin toward the front of the machine, so as to travel over and in engagement with a sprocket-wheel 88 that is rotatably mounted on a stud 89 fastened to plate 5. Said chain extends downwardly from sprocket-wheel 88 and passes through an opening 90 in band 11 and then passes under and in engagement with a sprocket-wheel 91, which is rotatably mounted on a stud-bolt 92, or the like, secured to the operating bar 93. From the sprocket-wheel 91 the chain 87 extends upwardly through another opening 90 in band 11 and then passes over and in engagement with the sprocket-wheel 47. From the sprocket-wheel 47 the chain 87 extends through a third opening 90 in band 11 and then passes over and in engagement with a sprocket-wheel 94 that is rigidly mounted on a shaft 95, said shaft being journaled in openings in a pair of plates 96 that depend from the top plate 1. Said plates 96 are secured to the top plate 1 by bolts 97 or other suitable means and support the mechanism for controlling the number of tickets 20 to be issued by the machine, as hereinafter described, being connected by rods 98. A plate 99 is riveted or otherwise secured to division plate 8, and has one end thereof bent so as to brace the particular plate 96 adjacent which the sprocket-wheel 94 is located. The chain 87 extends downwardly from sprocket-wheel 94 and has its end attached to one end of a spring 100, the other end of said spring being attached to a pin 101 borne by plate 8. In order to afford a means for adjusting the length of chain 87, two connecting links 102 thereof are separated and a suitable adjusting device is interposed between said links. For the purpose of illustration, an adjusting device is depicted in the drawings, which device consists of a member 103 that is secured to one of said links 102 and a member 104 that is secured to the other of said links, said member 103 having a screw-threaded opening 105 in which a screw-threaded pin 106 borne by member 104 fits, as best seen in Fig. 15. By turning either the member 103 or member 104, the length of the chain 87 may be increased or decreased.

The operating bar 93 is reciprocatively attached to division plate 8 by means of studs 107 that pass through slots 108 in said bar, and is guided in its movement by said studs, being preferably operated by a foot treadle (not shown) and connected therewith by a chain 109 or other suitable means. The bolt 92 extends through an opening in a plate 110 which is preferably located between sprocket-wheel 91 and operating bar 93. Projections 111 on plate 110 embrace the operating bar 93, in order to prevent said plate from rotating on bolt 92, and the ends of said plate 110 are bent outwardly so as to extend near the chain 87 on sprocket-wheel 91, whereby said chain is prevented from being disengaged from said sprocket-wheel. A plate 112 is rotatably mounted on shaft 27 and is secured to the hub 46 of sprocket-wheel 47, so as to rotate with said sprocket-wheel. The pull of spring 100 tends to rotate the sprocket-wheel 47 in a clockwise direction, Fig. 5, and thereby holds the arm 113 of plate 112 normally against a pin 114 borne by plate 4, with the result that the part of chain 87 that extends from sprocket-wheel 47 to spring 100 is held taut by the pull of said spring. By reason of the arm 113 of plate 112 being held in engagement with the pin 114, as just described, the spring 100 is prevented normally from exerting any pull on the part of the chain 87 that extends from the sprocket-wheel 47 to the pin 82 borne by plate 62, whereby the pull of spring 100 is prevented normally from acting against the pull of spring 81. The part of the chain 87 that extends from sprocket-wheel 47 to pin 82 supports the operating bar 93 normally in a raised position, and when the foot treadle is depressed, the bar 93 descends, pulling sprocket-wheel 91 and chain 87 with it against the pull of springs 81 and 100. The spring 100 being weaker than spring 81 stretches and thereby allows the chain 87 to travel over the sprocket-wheels 47 and 94, with the result that said sprocket-wheels 47 and 94 rotate in a counter-clockwise direction, Fig. 5, until the nose 52 of each pawl 48 enters a notch 45 in ratchet-wheel 44, after which the sprocket-wheels 47 and 94 cease rotating until the chain 87 pulls the plate 62 forwardly against the pull of spring 81, whereby the knife 67 moves away from the opening 25 in plate 1 and the cut-away part 86 of plate 62 moves to a position to allow the nose of pawl 41 to move out of a notch 40 in ratchet-wheel 39, as hereinabove described. The chain 87 then rotates sprocket-wheels 47 and 94 again in a counter-clockwise direction, Fig. 5, whereby the drum 24 rotates in a counter-clockwise direction and feeds a ticket or tickets 20 through opening 25 in plate 1, as hereinabove described. After the chain 87 rotates the sprocket-wheel 47 the extent necessary to feed the desired number of tickets through opening 25, pressure is removed from the foot-treadle, with the result that the pull of springs 81 and 100 return the chain 87 to its normal position. The spring 81, being stronger than spring 100, pulls the plate 62 rearwardly to its initial position, whereby the knife 67 severs the issued ticket or tickets 20 from the roll, after which the pull of spring 100 causes the chain 87 to rotate the sprocket-wheels 47 and 94 in a clockwise direction, Fig. 5, until the arm 113 of plate 112 engages the pin 114, thus returning the ratchet-wheel 44 to its initial position, as hereinabove described.

The part of the shaft 95 that extends between the plates 96 is preferably formed with a rectangular cross-sectional configuration and has a mutilated ratchet-wheel 115 mounted thereon, said ratchet-wheel having a non-serrated space 116 on the periphery thereof. The nose of a pawl 117 is normally held against the non-serrated space 116 on ratchet-wheel 115 by means of a spring 118 that is attached at one end thereof to said pawl and at the other end to a rod 98, said pawl being loosely mounted on a shaft 119 that is journaled in openings in plates 96. The teeth of the ratchet-wheel 115 are predeterminedly and accurately spaced apart, so that the nose of pawl 117 will come into contact with tooth 120 when the depression of the foot treadle has so rotated sprocket-wheel 94 rigidly mounted on shaft 95 as to have caused ratchet-wheel 115 on said shaft to rotate to the extent that the non-serrated space 116 thereon has passed by the nose of pawl 117. When pawl 117 thus engages the tooth 120, further rotation of ratchet-wheel 115 and shaft 95 is prevented. While the ratchet-wheel 115 is thus rotated until limited by the engagement of tooth 120 with the nose of pawl 117, the movement of chain 87 is limited to the distance merely sufficient to rotate drum 24 the proper extent necessary to feed one ticket 20 through opening 25 in plate 1 through the intermediation of sprocket-wheel 47, ratchet-wheel 44, pawls 48, and ratchet-wheel 39, as hereinabove described. When the pressure is released from the foot treadle so as to allow the chain 87 to return to its normal position, as hereinabove described, the sprocket-wheel 94 and shaft 95 rotate in a clockwise direction, Fig. 2, and thereby rotate the ratchet-wheel 115 to its initial position, thus moving the tooth 120 out of engagement with the nose of pawl 117.

In case it is desired to issue several tickets 20, it would be a waste of effort to repeat the operation of depressing the foot treadle for each ticket, and, accordingly, under such circumstances, by means of buttons 121, mechanism about to be described can be operated by merely depressing the proper button, so as to allow the chain 87 to travel the distance necessary to rotate the drum 24 sufficiently to feed the desired number of tickets 20 through opening 25 by a single operation of depressing said foot treadle. It will be understood that, while the machine is herein illustrated and described as of a certain prearranged capacity, yet same can be constructed with either a greater or lesser capacity, or two or more such machines in bank can be used, according to the needs of the use to which it is to be put. Thus, while the drawings illustrate four buttons 121 that govern the issuance of two, three, four, and five tickets 20, respectively, as indicated by the ordinals 2, 3, 4, and 5 that may appear on the upper surface of the top plate 1 adjacent said buttons, yet a greater or a lesser number of buttons may be provided as necessity requires.

The buttons 121 extend through openings 122 provided therefor in plate 1 and, also, through openings 123 in a plate 124, which connects the two plates 96. Each button 121 is provided with an annular flange or rib 125 that is held normally against the under side of plate 1 by a spring 126, so that normally the top of said button extends above the upper surface of plate 1. The lower end of button 121 extends below the plate 124 and has a circumferential groove 127. A pawl 128 is loosely mounted on a shaft 129 and is provided with a beveled side 130, which is held in engagement with the lower end of said button by means of a spring 131, so that when said button is depressed, the lower end thereof presses against the beveled side 130 of pawl 121 and thereby rotates said pawl clockwise, Fig. 10, until the hook 132 of said pawl enters the groove 127 in said button, thereby holding said button in a depressed position. When the pawl 128 is thus rotated by the depression of button 121, the upper end 133 of said pawl moves into the path of rotation of a projection 134 borne by plate 135, which is rigidly mounted on shaft 95, and remains in the path of rotation of said projection, so as to limit the rotation of said shaft, as hereinafter described.

A plate 136 is riveted or otherwise secured to shaft 119 and is arranged to extend beneath and close to the lower end of button 121, so that when said button is depressed as just described, the lower end thereof presses against plate 136 and thereby causes said plate to rotate shaft 119 in a counter-clockwise direction, Fig. 10, whereby the nose of pawl 117 is moved out of the path of travel of the teeth of ratchet-wheel 115, as hereinafter described, so as to allow the shaft 95 to rotate sufficiently to bring the projection 134 on plate 135 into engagement with the end 133 of pawl 128. It should be understood that there is as many pawls 128 as buttons 121 and, also, as many plates 135 as pawls 128, said plates 135 and pawls 128 being spaced apart on shaft 95 and 129 by collars 137 and 138, respectively. When the machine is provided with four buttons 121, only two plates 136 are necessary, each plate being arranged so as to extend underneath two buttons 121, so that, when either button is depressed, said plate is caused to rotate shaft 119, as hereinabove described. A spring 139 is attached at one end to one of the plates 136 and at the other end to a rod 98 and tends to rotate shaft 119 clockwise, Fig. 10, thereby holding said plates in engagement with the lower ends of buttons 121. The pawl 117 is located between the prongs 140 of the bifurcated end of one of the plates 136 and is provided with a projection 141, which underlies said plate. Said projection fits close to the lower side of said plate 136 so that, when shaft 119 is rotated by the depression of a button 121, said plate presses against the projection 141 and thereby moves the pawl 117 out of the path of rotation of the teeth of ratchet-wheel 115.

The plates 135 are arranged so that the projections 134 thereon are spaced apart circumferentially about the shaft 95 relative to the tooth 120 of ratchet-wheel 115 in the following manner: Counting from the right to left, Fig. 9, the first plate 135, i. e., the plate for the button 121 that governs the issuance of two tickets, has its projection 134 located behind the tooth 120 of ratchet-wheel 115; the second plate 135, i. e., the plate for the button 121 that governs the issuance of three tickets, has its projection 134 located behind the projection 134 on the first plate 135; the third plate 135, i. e., the plate for the button 121 that governs the issuance of four tickets, has its projection 134 located behind the projection 134 on the second plate 135; and the fourth plate 135, i. e., the plate for the button 121 that governs the issuance of five tickets, has its projection 134 located behind the projection 134 on the third plate 135, as best seen in Fig. 10. By this arrangement, whenever it is desired to issue more than one ticket, the proper button 121 is depressed, whereby the end 133 of pawl 128 beneath same moves into the path of rotation of projection 134 on the plate 135 adjacent thereto, and the nose of pawl 117 moves out of the path of rotation of the teeth of ratchet-wheel 115, so that, when the shaft 95 is rotated in a counter-clockwise direction, Fig. 10, by the depression of the foot treadle, as hereinabove described, the teeth of ratchet-wheel 115 pass the nose of pawl 117 and the end 133 of said pawl 128 engages the projection 134 on said plate 135, thereby preventing further rotation of shaft 95 after same has rotated sufficiently to allow the chain 87 to travel the distance necessary to cause the drum 24 to feed the desired number of tickets through opening 25. This engagement of projection 134 with the end 133 of pawl 128 draws the hook 132 on said pawl out of the groove 127 in said button 121, with the result that said button returns to its normal position and thereby allows the pull of spring 139 to rotate shaft 119 clockwise, Fig. 10, until the plates 136 return to their initial positions, whereby the pull of spring 118 draws the pawl 117 into engagement with ratchet-wheel 115, so as to prevent the shaft 95 from being rotated forwardly until same returns to its initial position.

In order to prevent the shaft 95 from being allowed to rotate rearwardly, i. e., clockwise, Fig. 10, until same has reached the limit of its forward movement by reason of the engagement of projection 134 on a plate 135 with the end 132 of a pawl 128, as hereinabove described, a ratchet-wheel 142 is rigidly mounted on said shaft 95. A pawl 143 is pivotally attached at 144 to a plate 96 and is arranged to extend through a notch 145 in shaft 119, being held in said notch by a spring 146. The notch 145 normally occupies an inclined position relative to pawl 143, so that the corner 147 thereof holds said pawl normally out of engagement with ratchet-wheel 142, as best seen in Fig. 11, but, when the shaft 119 is rotated in a counter-clockwise direction by the depression of a button 121, as hereinabove described, said notch moves to a position substantially parallel to the side of said pawl within same, thereby allowing the spring 146 to draw said pawl into engagement with said ratchet-wheel. The pawl 143 remains in engagement with ratchet-wheel 142 and prevents the retrogression of same until said shaft has been rotated forwardly, i. e., counterclockwise, Fig. 10, sufficiently to bring the projection 134 on a plate 135 into engagement with the end 133 of a pawl 128, whereupon the release of the button 121 controlling said pawl allows said button to return to its initial position, with the result that shaft 119 returns to its normal position, whereby the corner 147 moves pawl 143 out of engagement with ratchet-wheel 142, in order to allow the shaft 95 to return to its normal position.

In case of accidental or erroneous depression of one of the buttons 121, the use of the error key or lever 148 will effect the release of same. The key 148 is loosely mounted on shaft 119, and the upper end thereof extends through a slot 149 in top plate 1. The lower end of said key engages a roller 150 on a rod 151, which connects a pair of plates 152, said plates being loosely mounted on shaft 129 and being located adjacent the plates 96. The rod 151 extends close to the rear side of the lower end of each pawl 128, so that when the upper end of the error key 148 is moved toward the rear of the machine, the lower end thereof moves forwardly and thereby presses against the roller 150, whereby the rod 151 moves forwardly against the lower ends of pawls 128, with the result that said pawls 128 rotate counter-clockwise, Fig. 10, sufficiently to cause the hook 132 of one of said pawls to release the button 121 that was accidentally or erroneously depressed. In case the foot treadle is depressed, when two buttons 121 have been depressed, the shaft 95 rotates forwardly until stopped by reason of the engagement of the projection 134 on plate 135 with the end 133 of the pawl 128 controlled by the button 121 adjacent the ordinal of the lower order of the depressed buttons, with the result that the drum 24 rotates sufficiently to feed the same number of tickets 20 through opening 25 as indicated by the lower ordinal adjacent the depressed buttons. The shaft 95 is thus locked from being rotated sufficiently forward, in order to release the depressed button 121 of higher order, with the result that the pawl 143 remains in engagement with ratchet-wheel 142, thereby locking said shaft 95 from retrogression. Under such circumstances, the error key 148 is moved rearwardly, whereby the lower end of same presses the rod 151 forwardly, so as to release the depressed button 121, as hereinabove described, and, also, presses against a pin 153 borne by pawl 143, with the result that said pawl moves out of engagement with ratchet-wheel 142, thereby allowing the shaft 95 to return to its initial position.

The strip of tickets 20 that passes over drum 24 is held in engagement therewith by means of a roller or rollers 154 rotatably mounted on a rod 155 that passes through slots 156 in a pair of plates 157, said plates being rotatably mounted on a rod 158 that connects plates 5 and 8 and being spaced apart from each other and, also, from said plates 5 and 8 by collars 159. Said plates 157 are located underneath the cover 78 and are connected by a rod 160 to which one end of a spring 161 is attached, the other end of said spring being attached to rod 155, so that the pressure of said spring tends to move the rod 155 toward the drum 24, thereby causing the rollers 154 to press the strip of tickets 20 into engagement with said drum. Each plate 157 is preferably formed with somewhat of a triangular configuration and one edge thereof that is adjacent the periphery of drum 24 is curved so as to be substantially concentric to said drum, in order to allow the strip of tickets to pass between same and said drum. Said plate 157 bears an ear 162 that is held against the under side of cover 78 by the pressure of spring 161, when said cover is in position to close the opening 77. The cover 78 thus resists the pressure of spring 161, whereby said spring causes the rollers 154 to hold the strip of tickets into engagement with drum 24, when the cover 78 closes the opening 77. When the cover 78 is moved to one side so as to uncover the opening 77, the plates 157 can be rotated upwardly on rod 158, in order to move the rollers 154 away from the drum 24 for the purpose of allowing a fresh strip of tickets to be placed in position on said drum. When the plates 157 are held in position by the cover 78, as just described, the rollers 154 hold the strip of tickets 20 into engagement with the drum 24 so that when the drum is rotated counter-clockwise, Fig. 6, the pins 23 borne by said drum pass between the plates 157 and enter the perforations 22 in the tickets 20, thereby feeding a ticket or tickets 20 through opening 25, as hereinabove described.

As the supply of tickets decreases from the continuous issuing of same, it is desirable to lock the drum 24 when the last ticket 20 of the roll 12 has been fed through the opening 25. A plate 163, which is rotatably mounted on rod 158, is located adjacent one of the plates 157 and is provided with a projection 164, which is held in engagement with the strip of tickets 20 on drum 24 by means of a spring 165, being disposed in substantially the same plane with a plurality of slots 166 in the periphery of drum 24 and being located between rollers 154 and opening 25. Said slots 166 are arranged in circumferential alinement and are spaced apart so that, when the drum 24 is at rest, the projection 164 occupies a position above a slot 166, but is prevented from entering said slot by reason of a ticket 20 being between same and said slot. When the last ticket passes through the opening 25 by the rotation of drum 24, the spring 165 causes the projection 164 on plate 163 to enter the first slot 166 behind the last ticket, thereby preventing said drum from being rotated further until a fresh strip of tickets is placed in position thereon, as hereinabove described. A plate 167, which is, also, rotatably mounted on rod 158, is preferably located adjacent the other plate 157 and bears a pin 168 on which a roller 169 is rotatably mounted. Said roller is located between the opening 25 and rollers 154 and is held in engagement with the strip of tickets on drum 24 by means of a spring 170, so that, when two or more tickets 20 remain in the machine and the drum 24 is rotated to feed all except the last ticket 20 through opening 25, the roller 169 holds the last ticket in engagement with the drum 24 and thereby prevents same from passing through said opening until the drum 24 is again rotated. By this arrangement, the last ticket 20 is held wholly in the machine so as to prevent the knife 67 from severing same in the wrong place.

In order to register the number of tickets 20 that are issued by the machine, a registering or numbering machine 171 of any ordinary construction is provided. Said registering machine is riveted or otherwise secured to the under side of plate 1 and is located beneath an opening 172 in said plate. A gear 173 borne by the shaft 174 of the registering machine meshes with a gear 175 that is driven by a gear 176 rigidly mounted on the hub 26 of drum 24, said gear 175 being rotatably mounted on a pin 177 secured to plate 8. When the drum 24 is rotated so as to feed a ticket or tickets 20 through the opening 25, as hereinabove described, the gear 176 rotates with said drum and thereby rotates the shaft 174 of the registering machine 171 through the medium of gears 173 and 175, sufficiently to register same in said machine. The registering machine can be read through the opening 172, and, in order to prevent same from being tampered with, a cover 178 is provided for said opening. The cover 178 is bent at one end thereof, so as to form somewhat of a semi-cylindrical hinge 179 that extends through a narrow space 180 left between the side of the registering machine 171 and an end of the opening 172, and when the loose end of said cover is raised to uncover said opening or lowered to close said opening, the hinge 179 slides through said space. A spring 181 attached to plate 8 holds the end of hinge 179 in engagement with the under side of plate 1 and thereby tends to hold the loose end of cover 178 in a raised position. Ears 182 borne by the hinge 179 prevent same from being withdrawn from the space 180 when the loose end of cover 178 is raised. The loose end of cover 178 bears a lip 183 and, when the loose end of said cover is lowered to close the opening 172, a beveled side 184 of said lip engages an arm 185 of a bell-crank 186 of lock 187 and thereby rotates said bell-crank counter-clockwise, Fig. 7, on its pivot 188 until the pressure of spring 189 causes said arm to enter a notch 190 in said lip, whereby said cover is locked in position to close opening 172. The casing of the lock 187 is riveted or otherwise secured to the under side of plate 1, and a keyhole 191 in said plate permits of the insertion of a key (not shown), which, when turned in said keyhole, engages the arm 192 of bell-crank 186, thereby rotating said bell-crank counter-clockwise, Fig. 7, sufficiently to withdraw the arm 185 from notch 190, so as to allow the spring 181 to raise the cover 178.

If, at any time, it is desired to prevent the machine from being operated, same may be locked by the following means: The casing of a lock 193 is riveted or otherwise secured to division plate 8 and is located adjacent a shoulder 194 borne by the operating bar 93. A plate 195 extends through openings in the casing of lock 193 and contains a slot 196, into which pins 197 project from plate 8, so as to support said plate 195 and also to limit the movement of same. A spring 198 is attached at one end thereof to plate 195 and at the other end to pin 199 borne by plate 8 and holds the forward end of said plate 195 normally out of the path of movement of shoulder 194 on operating bar 93, so as to allow said bar to move up and down. The rear end of plate 195 bears an ear 200 which affords a means for moving said plate toward the operating bar. Normally the shoulder 194 on the operating bar 93 occupies a position above the level of the plate 195, and, if it is desired to render the machine temporarily inoperative, pressure is applied to the ear 200 so as to move the plate 195 toward the operating bar 93 when the operating bar occupies its normal position, whereby the forward end of plate 195 moves into the path of travel of said shoulder, in order to prevent the operating bar from being lowered. A bell-crank 201 is located in the casing of lock 193 and may be pivoted at 202 either to plate 8 or to said casing. A spring 203, which is attached at one end thereof to an arm 204 of bell-crank 201 and at the other end to pin 205 borne by plate 8, tends to rotate said bell-crank clockwise, Fig. 2, and thereby holds the arm 206 of same normally into engagement with a projection 207 borne by plate 195, so that, when said plate 195 is moved toward the operating bar 93 until the projection 207 passes the end of arm 206, the pull of spring 203 causes the bell-crank to rotate clockwise, Fig. 2, with the result that the end of arm 206 moves behind the projection 207 and thereby locks the plate 195 in position to lock the operating bar 93 in its normal position, thus rendering the machine temporarily inoperative. A keyhole 208 in the casing of lock 193 permits of the insertion of a key (not shown) which, when turned in said keyhole, engages the arm 204 of bell-crank 201 and thereby rotates said bell-crank counter-clockwise, Fig. 2, whereby the end of arm 206 moves from behind projection 207 on plate 195, with the result that spring 198 returns said plate 195 to its initial position, in order to move the forward end of said plate out of the path of movement of the shoulder 194 on operating bar 93.

In order to prevent the tickets 20 from following the drum 24 past the opening 25, a plate or guide 209 is riveted or otherwise secured to the under side of plate 1. Said plate 209 is located adjacent opening 25 and is arranged to slope downwardly therefrom, in order to guide the tickets 20 through said opening, the lower edge of same being close to the periphery of drum 24, so as to prevent the tickets from traveling by same on said drum, and having a notch 210 to allow the pins 23 to pass therethrough.

The operation of the machine is as follows: When the foot treadle is depressed, the operating bar 93 descends and draws with it sprocket-wheel 91, which, in turn, pulls the chain 87 downwardly, thereby rotating sprocket-wheel 47 counter-clockwise, Fig 5, until the nose 52 of each pawl 48 enters a notch 45 in ratchet-wheel 44. The chain 87 then pulls the plate 62 forwardly, so as to move the knife 67 away from opening 25 and, also, to move the cutaway part 86 to a position to allow the beveled corner 85 of pawl 41 to enter same, whereupon the chain 87 rotates the sprocket-wheel 47 further in a counter clockwise direction, Fig. 5, thereby rotating the drum 24 in the same direction through the intermediation of ratchet-wheel 44, pawls 48, and ratchet-wheel 39, with the result that the drum 24 feeds a ticket or tickets 20 through opening 25, after which the foot treadle is released. The release of the foot treadle allows the springs 81 and 100 to return the chain 87 and operating bar 93 to their initial positions. The spring 81 being stronger than spring 100 pulls the plate 62 forwardly to its initial position, whereby the knife 67 severs the issued ticket or tickets 20 from the strip of tickets within the machine, and the cut-away part 86 moves to its initial position, so that said plate 62 prevents the pawl 41 from being withdrawn from a notch 40 in ratchet-wheel 39, while the ratchet-wheel 44 returns to its initial position. After the pull of spring 81 returns the plate 62 to its initial position, the pull of spring 100 returns the chain 87 to its normal position and thereby rotates sprocket-wheel 47 and ratchet-wheel 44 clockwise, Fig. 5, to their initial positions as hereinabove described. If it is desired to issue one ticket 20, it is only necessary to depress the foot treadle without depressing any of the buttons 121. When the operating bar 93 descends and pulls the chain 87 with it, said chain rotates the sprocket-wheel 94 counter-clockwise, Fig. 2, and thereby rotates shaft 95 in the same direction until the nose of pawl 117 engages the tooth 120 of ratchet-wheel 115. This engagement of pawl 117 with the tooth 120 of ratchet-wheel 115 prevents further rotation of shaft 95 and thereby limits the travel of chain 87 to the distance necessary to rotate the drum 24 sufficiently to feed one ticket 20 through opening 25, after which the foot treadle is released, so as to allow the chain 87 to return to its initial position, as hereinabove described. The return of the chain 87 to its initial position not only allows the knife 67 to return to its initial position to sever the issued ticket 20 from the strip of tickets within the machine and, also, the ratchet-wheel 44 to return to its initial position, as hereinabove described, but rotates the sprocket-wheel 94 and shaft 95 clockwise, Fig. 2, thereby returning ratchet-wheel 115 to its normal position. Whenever it is desired to issue more than one ticket, the proper button 121 is depressed, so as to allow the chain 87 to travel the distance necessary to rotate the drum 24 sufficiently to feed the desired number of tickets through opening 25, as hereinabove described, when the foot treadle is depressed. In case a button 121 is depressed in order to issue a desired number of tickets 20, when less than that number of tickets is in the machine, the drum 24 rotates only sufficient to issue the tickets within the machine through opening 25, whereupon the projection 164 on plate 163 enters a slot 166 in drum 24 and thereby locks said drum from further rotation until a ticket strip from a fresh roll 12 is inserted in position in engagement with drum 24, in order to feed the balance of the desired number of tickets through the opening 25 upon further depression of the foot treadle. For example, if the proper button 121 is depressed to issue five tickets, when the foot treadle is depressed, and only three tickets are in the machine, the projection 164 on plate 163 enters a slot 166 in drum 24 immediately after said drum issues the three tickets through the opening 25, thereby locking said drum from further rotation. As this locking of drum 24 does not effect the release of the depressed button 121, said button remains depressed and thereby prevents the chain 87 from returning to its initial position, by reason of the engagement of pawl 143 with ratchet-wheel 142. A ticket strip from a fresh roll 12 is then placed in engagement with drum 24 so as to pass through opening 25 after which the foot treadle is depressed further, with the result that said drum rotates sufficiently to feed two more tickets through the opening 25. By this arrangement, it is unnecessary for the operator to make inquiry of the purchaser as to the number of tickets that are due the latter, when the drum locks under such circumstances.

We claim:

1. A machine of the character described having an exit for tickets from a perforated ticket strip and comprising in combination, a slotted rotatable drum, pins borne by said drum adapted to enter the perforations in the ticket strip, thereby to feed same through the exit, means for rotating said drum intermittently, and automatic means for engaging a slot in said drum when the last ticket of the ticket strip is fed through the exit, for locking said drum against subsequent rotation.

2. A machine of the character described having an exit for tickets from a ticket strip and comprising in combination, a rotatable drum provided with means adapted to engage said ticket strip for feeding same through the exit, a knife for severing the issued tickets from the ticket strip in the machine and normally closing the exit, means for rotating said drum and adapted to move said knife away from the exit, means for returning said knife to its normal position, and a locking member interposed between said drum and knife and adapted to be held in engagement with the former by the latter until same uncovers said exit.

3. In a machine of the character described having an exit for tickets from a rolled perforated ticket strip, the combination of a rotatable drum, a support whereon the ticket roll is revolubly mounted, pins borne by said drum adapted to enter the perforations in the ticket strip, thereby to feed same through the exit, means for rotating said drum, a pivoted member pivoted on said support, a roller revolubly attached to said member, a spring holding said roller in engagement with the ticket strip between the roll and said drum, thereby to hold same taut, and a guide secured to said member and partly encircling said roller for holding the ticket strip in engagement with said roller.

4. In a machine of the character described, the combination of a shaft, a drum revoluble thereon and having means for feeding a perforated ticket strip, a ratchet-wheel revolubly mounted on said shaft, a ratchet-wheel secured to said drum, a pawl pivoted to said second-mentioned ratchet-wheel, a spring holding the nose of said pawl in engagement with said first-mentioned ratchet-wheel, and means for imparting rotary reciprocatory motion to said first-mentioned ratchet-wheel.

5. In a machine of the character described, the combination of a shaft, a drum revoluble thereon and having means for feeding a perforated ticket strip, a ratchet-wheel revolubly mounted on said shaft, a ratchet-wheel secured to said drum, a pawl pivoted to said second-mentioned ratchet-wheel, a spring holding the nose of said pawl in engagement with said first-mentioned ratchet-wheel, means for imparting rotary reciprocatory motion to said first-mentioned ratchet-wheel, and a pawl preventing retrograde movement of said second-mentioned ratchet-wheel.

6. In a machine of the character described, the combination of a shaft, a drum revoluble thereon and having means for feeding a perforated ticket strip, a ratchet-wheel revolubly mounted on said shaft, a ratchet-wheel secured to said drum, a pair of pawls pivoted to said second-mentioned ratchet-wheel, springs holding the noses of said pawl in engagement with said first-mentioned ratchet-wheel, means for imparting rotary reciprocatory motion to said first-mentioned ratchet-wheel, and a pawl preventing retrograde movement of said second-mentioned ratchet wheel.

7. In a machine of the character described, the combination of a shaft, a drum revoluble thereon and having means for feeding a perforated ticket strip, a ratchet-wheel revolubly mounted on said shaft, a ratchet-wheel secured to said drum, a pawl carried by said second-mentioned ratchet-wheel, means for holding said pawl in engagement with said first-mentioned ratchet-wheel, a pawl preventing retrograde movement of said second-mentioned ratchet-wheel a sprocket-wheel revolubly mounted on said shaft and secured to said first-mentioned ratchet-wheel, a chain engaging said sprocket-wheel for rotating same, and means for actuating said chain.

8. In a machine of the character described, the combination of a shaft, a drum revoluble thereon and having means for feeding a perforated ticket strip, a ratchet-wheel revolubly mounted on said shaft, a ratchet-wheel secured to said drum, a pawl carried by said second-mentioned ratchet-wheel, means for holding said pawl in engagement with said first-mentioned ratchet-wheel, a pawl preventing retrograde movement of said second-mentioned ratchet-wheel, a sprocket-wheel revolubly mounted on said shaft and secured to said first-mentioned ratchet-wheel, a chain engaging said sprocket-wheel, means for feeding said chain in one direction, and means for automatically returning said chain to its normal position.

9. In a machine of the character described, the combination of a shaft, a drum revoluble thereon and having means for feeding a perforated ticket strip, a ratchet-wheel revolubly mounted on said shaft, a ratchet-wheel secured to said drum, a pawl carried by said second-mentioned ratchet-wheel, means for holding said pawl in engagement with said first-mentioned ratchet-wheel, a pawl preventing retrograde movement of said second-mentioned ratchet-wheel, a sprocket-wheel revolubly mounted on said shaft and secured to said first-mentioned ratchet-wheel, a chain engaging said sprocket-wheel, means for feeding said chain in one direction, means for automatically returing said chain to its normal position, and means for limiting the forward movement of said chain.

10. In a machine of the character described, the combination of a shaft, a drum revoluble thereon and having means for feeding a perforated ticket strip, a ratchet-wheel revolubly mounted on said shaft, a ratchet-wheel secured to said drum, a pawl carried by said second-mentioned ratchet-wheel, means for holding said pawl in engagement with said first-mentioned ratchet-wheel, a pawl preventing retrograde movement of said second-mentioned ratchet-wheel, a sprocket-wheel revolubly mounted on said shaft and secured to said first-mentioned ratchet-wheel, a chain engaging said sprocket-wheel, means for feeding said chain in one direction, means for automatically returning said chain to its normal position, means for limiting the forward movement of said chain, and means for limiting the backward movement of said chain.

11. In a machine of the character described, the combination of a shaft, a drum revoluble thereon and having means for feeding a ticket strip, a sprocket-wheel revolubly mounted on said shaft, means operated by said sprocket-wheel for rotating said drum intermittently, a chain engaging said sprocket-wheel for rotating same, means for causing said chain to travel in one direction, and a spring for returning said chain to its initial position.

12. In a machine of the character described, the combination of a shaft, a drum revoluble thereon and having means for feeding a ticket strip, a sprocket-wheel revolubly mounted on said shaft, means operated by said sprocket-wheel for rotating said drum intermittently, a chain engaging said sprocket-wheel for rotating same, means for causing said chain to travel in one direction, a spring for returing said chain to its initial position, and means for limiting the travel of said chain.

13. In a machine of the character described, the combination of a shaft, means for rotating same forwardly, means for automatically rotating said shaft rearwardly to its initial position, a mutilated ratchet-wheel borne by said shaft having a non-serrated space, and a pawl normally engaging the non-serrated space on said ratchet-wheel and adapted to limit the forward movement of said shaft.

14. In a machine of the character described, the combination of a shaft, means for rotating same forwardly, means for automatically rotating said shaft rearwardly to its initial position, a mutilated ratchet-wheel borne by said shaft, a pawl limiting the forward movement of said shaft, and a spring holding said pawl in engagement with said ratchet-wheel.

15. In a machine of the character described, the combination of a shaft, a plate borne by said shaft and bearing a projection, a pawl, means for holding said pawl normally out of the path of travel of the projection on said plate, and a depressible member for moving said pawl into the path of travel of the projection on said plate, thereby to limit the movement of said shaft.

16. In a machine of the character described, the combination of a shaft, a plate borne by said shaft and bearing a projection, a pawl, means for holding said pawl normally out of the path of travel of the projection on said plate, a depressible member for moving said pawl into the path of travel of the projection on said plate, thereby to limit the movement of said shaft, and means borne by said pawl for locking said member in a depressed position.

17. In a machine of the character described, the combination of a shaft, a plate borne by said shaft and bearing a projection, a pawl, means for holding said pawl normally out of the path of travel of the projection on said plate, a depressible member for moving said pawl into the path of travel of the projection on said plate, thereby to limit the movement of said shaft, and means borne by said pawl for locking said member in a depressed position, the projection on said plate being adapted to move said pawl out of locking engagement with said member.

18. In a machine of the character described, the combination of a shaft, a plate borne by said shaft and bearing a projection, a pawl, means for holding said pawl normally out of the path of travel of the projection on said plate, a depressible member for moving said pawl into the path of travel of the projection on said plate, thereby to limit the movement of said shaft, means borne by said pawl for locking said member in a depressed position, the projection on said plate being adapted to move said pawl out of locking engagement with said member, and means for returning said member to its initial position.

19. In a machine of the character described, the combination of a shaft, a plate borne by said shaft and bearing a projection, a pawl, means for holding said pawl normally out of the path of travel of the projection on said plate, a depressible member for moving said pawl into the path of travel of said projection, said member having a peripheral groove, a hook borne by said pawl adapted to enter the groove in said member, thereby to hold same in a depressed position, the projection on said plate being adapted to move said hook out of the groove in said member, and a spring for returning said member to its initial position.

20. In a machine of the character described, the combination of a shaft, means for limiting the forward movement of said shaft, and depressible means for actuating said limiting means.

21. In a machine of the character described, the combination of a shaft, means for limiting the forward movement of said shaft, depressible means for actuating said limiting means, and means for preventing retrograde movement of said shaft until same reaches the limit of its forward movement.

22. In a machine of the character described, the combination of a shaft, means for limiting the forward movement of said shaft, depressible means for actuating said limiting means, means for preventing retrograde movement of said shaft until same reaches the limit of its forward movement, and means for preventing forward movement of said shaft until same returns to its initial position.

23. In a machine of the character described, the combination of a shaft, a mutilated ratchet-wheel borne by said shaft and having a non-serrated space, a pawl normally engaging the non-serrated space on said ratchet-wheel, a plate borne by said shaft and bearing a projection, a pawl, means for holding said second-mentioned pawl out of the path of travel of the projection on said plate, a depressible member for moving said second-mentioned pawl into the path of travel of the projection on said plate, thereby to limit the forward movement of said shaft, and means operated by said member for moving said first-mentioned pawl out of engagement with said ratchet-wheel.

24. In a machine of the character described, the combination of a shaft, a plurality of plates borne by said shaft, a corresponding plurality of pawls, each of said plates being provided with a projection, means for holding said pawls out of the paths of travel of the projections on said plates, and selective buttons for moving said pawls into the paths of travel of the projections on said plates, thereby to limit the forward movement of said shaft.

25. In a machine of the character described, the combination of a shaft, a plurality of plates borne by said shaft, a corresponding plurality of pawls, each of said plates being provided with a projection, means for holding said pawls out of the paths of travel of the projections on said plates, and selective buttons for moving said pawls into the paths of travel of the projections on said plates, thereby to limit the forward movement of said shaft, the projections on said plates being spaced apart approximately in helical alinement about said shaft.

26. In a machine of the character described, the combination of a shaft, a plate borne by said shaft and bearing a projection, a pawl, means for holding said pawl out of the path of travel of the projection on said plate, a depressible member for moving said pawl into the path of travel of said projection, thereby to limit the forward movement of said shaft, said pawl being adapted to lock said member in a depressed position, and means for releasing said pawl from locking engagement with said member.

27. In a machine of the character described, the combination of a shaft, a plate borne by said shaft and bearing a projection, a pawl, means for holding said pawl out of the path of travel of the projection on said plate, a depressible member for moving said pawl into the path of travel of said projection, thereby to limit the forward movement of said shaft, said pawl being adapted to lock said member in a depressed position, means for releasing said pawl from locking engagement with said member, and means for returning said member to its initial position.

28. In a machine of the character described, the combination of a shaft, a plate borne by said shaft and bearing a projection, a pawl, means for holding said pawl normally out of the path of travel of said projection, a depressible member adapted to move said pawl into the path of travel of said projection, thereby to limit the forward movement of said shaft, means borne by said member for holding said member in a depressed position, and a detent for preventing retrograde movement of said shaft until same reaches the limit of its forward movement.

29. In a machine of the character described, the combination of a shaft, a plate borne by said shaft and bearing a projection, a pawl, means for holding said pawl normally out of the path of travel of said projection, a depressible member adapted to move said pawl into the path of travel of said projection, thereby to limit the forward movement of said shaft, means borne by said member for holding said member in a depressed position, a detent for preventing retrograde movement of said shaft until same reaches the limit of its forward movement, and means actuated by said member for controlling said detent.

30. In a machine of the character described, the combination of a shaft, means for rotating same forward and backward, a depressible button, and means actuated by said button for limiting the forward movement of said shaft.

31. In a machine of the character described, the combination of a shaft, means for rotating same forward and backward, a plurality of depressible buttons, and instrumentalities actuated by said buttons for limiting the forward movement of said shaft.

32. In a machine of the character described, the combination of a shaft, a plurality of plates borne thereby, a corresponding plurality of pawls, each of said plates being provided with a projection, means for holding said pawls normally out of the paths of rotation of said projections, selective buttons for moving said pawls into the paths of travel of said projections, thereby to limit the forward movement of said shaft, means borne by each pawl for holding its button in a depressed position, and means for actuating said pawls simultaneously to release said buttons.

33. In a machine of the character described, the combination of a shaft, a plurality of plates borne thereby, a corresponding plurality of pawls, each of said plates being provided with a projection, means for holding said pawls normally out of the paths of rotation of said projections, selective buttons for moving said pawls into the paths of travel of said projections, thereby to limit the forward movement of said shaft, means borne by each pawl for holding its button in a depressed position, means for actuating said pawls simultaneously to release said buttons, and means for returning said buttons to their initial positions.

34. In a machine of the character described, the combination of a shaft, a plurality of plates borne thereby, a corresponding plurality of pawls, each of said plates being provided with a projection, selective buttons for moving said pawls into the paths of travel of said projections, thereby to limit the forward movement of said shaft, each of said pawls having means for holding its button in a depressed position, a pivoted member, means actuated by said pivoted member for simultaneously moving said pawls out of engagement with said buttons, and means for returning said buttons to their initial positions.

35. In a machine of the character described, the combination of a shaft, a plate borne by said shaft and bearing a projection, a pawl, means for holding said pawl normally out of the path of rotation of said projection, means for moving said pawl into the path of rotation of said projection, thereby to limit the forward movement of said shaft, a ratchet-wheel borne by said shaft, a pawl, a rock-shaft having means for holding said last-mentioned pawl out of engagement with said ratchet-wheel, and means actuated by said moving means for rocking said rock-shaft, thereby to allow said last-mentioned pawl to engage said ratchet-wheel.

36. In a machine of the character described, the combination of a shaft, a plate borne by said shaft and bearing a projection, a pawl, means for holding said pawl normally out of the path of rotation of said projection, means for moving said pawl into the path of rotation of said projection, thereby to limit the forward movement of said shaft, a ratchet-wheel borne by said shaft, a pawl, a rock-shaft having means for holding said last-mentioned pawl out of engagement with said ratchet-wheel, means actuated by said moving means for rocking said rock-shaft, thereby to allow said last-mentioned pawl to engage said ratchet-wheel, and means for moving said last-mentioned pawl into engagement with said ratchet-wheel.

37. In a machine of the character described, the combination of a shaft, means for rotating same forward and back, means for limiting the forward movement of said shaft, a ratchet wheel borne by said shaft, a pawl, a rock-shaft having a notch, means for holding said pawl in the notch in said rock-shaft, said notch holding said pawl normally out of engagement with said ratchet-wheel, and means actuated by said limiting means for rocking said rock-shaft, thereby to allow said pawl to engage said ratchet-wheel.

38. In a machine of the character described, the combination of a main shaft, a drum revoluble thereon, a sprocket-wheel revolubly mounted on said shaft, instrumentalities actuated by said sprocket-wheel for rotating said drum intermittently, an auxiliary shaft, a sprocket-wheel borne by said auxiliary shaft, a chain engaging both of said sprocket-wheels, means for driving said chain forwardly, means for automatically returning said chain to its initial position, and means for limiting the rotation of said auxiliary shaft, thereby to limit the forward travel of said chain.

39. In a machine of the character described, the combination of a main shaft, a drum revoluble thereon, a sprocket-wheel revolubly mounted on said shaft, instrumentalities actuated by said sprocket-wheel for rotating said drum intermittently, an auxiliary shaft, a sprocket-wheel borne by said auxiliary shaft, a chain engaging both of said sprocket-wheels, means for driving said chain forwardly, means for automatically returning said chain to its initial position, means for limiting the rotation of said auxiliary shaft, thereby to limit the forward travel of said chain, and means for limiting the backward travel of said chain.

40. A machine of the character described having an exit for tickets from a ticket strip and comprising in combination, a shaft, a drum revoluble thereon and having means for feeding the strip through the exit, a sprocket-wheel revolubly mounted on said shaft, means actuated by said sprocket-wheel for rotating said drum intermittently, a knife normally closing the exit, a chain en-engaging said sprocket-wheel for rotating same, and means actuated by said chain for moving said knife away from the exit, said knife-moving means being adapted to prevent said drum from rotating until said knife uncovers the exit.

41. A machine of the character described having an exit for tickets from a ticket strip and comprising in combination, a shaft, a drum revoluble thereon and having means for feeding the strip through the exit, a sprocket-wheel revolubly mounted on said shaft, means actuated by said sprocket-wheel for rotating said drum intermittently, a knife normally closing the exit, a chain en- gaging said sprocket-wheel for rotating same, means actuated by said chain for moving said knife away from the exit, said knife-moving means being adapted to prevent said drum from rotating until said knife uncovers the exit, and means for returning said knife to its initial position.

42. A machine of the character described having an exit for tickets from a ticket strip and comprising in combination, a shaft, a drum revoluble thereon and having means for feeding the ticket strip through the exit, a sprocket-wheel revolubly mounted on said shaft, instrumentalities actuated by said sprocket-wheel for rotating said drum intermittently, a chain engaging said sprocket-wheel for rotating same, a reciprocatory severing means attached to one end of said chain, a spring holding said severing means normally in position to close the exit, means intermediate said member and said sprocket-wheel for drawing said chain forwardly, thereby to move said severing means away from the exit and, also, to rotate said sprocket-wheel forwardly, and a spring attached to the other end of said chain for returning same to its initial position.

43. A machine of the character described having an exit for tickets from a ticket strip and comprising in combination, a shaft, a drum revoluble thereon and having means for feeding the ticket strip through the exit, a sprocket-wheel revolubly mounted on said shaft, instrumentalities actuated by said sprocket-wheel for rotating said drum intermittently, a chain engaging said sprocket-wheel for rotating same, a reciprocatory severing means attached to one end of said chain, a spring holding said severing means normally in position to close the exit, means intermediate said member and said sprocket-wheel for drawing said chain forwardly, thereby to move said severing means away from the exit and, also, to rotate said sprocket-wheel forwardly, a spring attached to the other end of said chain for returning same to its initial position, and means for limiting the forward travel of said chain.

44. A machine of the character described having an exit for tickets from a ticket strip and comprising in combination, a shaft, a drum revoluble thereon and having means for feeding the ticket strip through the exit, a sprocket-wheel revolubly mounted on said shaft, instrumentalities actuated by said sprocket-wheel for rotating said drum intermittently, a chain engaging said sprocket-wheel for rotating same, a reciprocatory severing means attached to one end of said chain, a spring holding said severing means normally in position to close the exit, means intermediate said member and said sprocket-wheel for drawing said chain forwardly, thereby to move said severing means away from the exit and, also, to rotate said sprocket-wheel forwardly, a spring attached to the other end of said chain for returning same to its initial position, means for limiting the forward travel of said chain, and means for limiting the return movement of said chain and adapted to prevent said springs from normally acting against each other.

45. A machine of the character described having an exit for tickets from a ticket strip and comprising in combination, a shaft, a drum revoluble thereon and having means for feeding the ticket strip through the exit, a sprocket-wheel revolubly mounted on said shaft, instrumentalities actuated by said sprocket-wheel for rotating said drum intermittently, a chain engaging said sprocket-wheel for rotating same, a reciprocatory severing means attached to one end of said chain, a spring holding said severing means normally in position to close the exit, means intermediate said member and said sprocket-wheel for drawing said chain forwardly, thereby to move said severing means away from the exit and, also, to rotate said sprocket-wheel forwardly, a spring attached to the other end of said chain for returning same to its initial position, means for limiting the forward travel of said chain, and means for limiting the return movement of said chain and adapted to prevent said springs from normally acting against each other, said first-mentioned spring being stronger than said second-mentioned spring.

46. A machine of the character described having an exit for tickets from a ticket strip and comprising in combination, a shaft, a drum revoluble thereon and having means for feeding the ticket strip through the exit, a sprocket-wheel revolubly mounted on said shaft, instrumentalities actuated by said sprocket-wheel for rotating said drum intermittently, a chain engaging said sprocket-wheel for rotating same, severing means connected to said chain and actuated thereby, a reciprocatory member, and means borne by said member for actuating said chain.

47. A machine of the character described having an exit for tickets from a ticket strip and comprising in combination, a shaft, a drum revoluble thereon and having means for feeding the ticket strip through the exit, a sprocket-wheel revolubly mounted on said shaft, instrumentalities actuated by said sprocket-wheel for rotating said drum intermittently, a chain engaging said sprocket-wheel for rotating same, severing means normally closing the exit and connected to said chain, a reciprocatory member, and a sprocket-wheel rotatably secured to said member for causing said chain to travel forwardly.

48. A machine of the character described having an exit for tickets from a ticket strip and comprising in combination, a shaft, a drum revoluble thereon and having means for feeding the ticket strip through the exit, a sprocket-wheel revolubly mounted on said shaft, instrumentalities actuated by said sprocket-wheel for rotating said drum intermittently, a chain engaging said sprocket-wheel for rotating same, severing means normally closing the exit and connected to said chain, a reciprocatory member, a sprocket-wheel rotatably secured to said member for causing said chain to travel forwardly, and means for automatically returning said chain to its initial position.

49. A machine of the character described having an exit for tickets from a ticket strip and comprising in combination, a shaft, a drum revoluble thereon and having means for feeding the ticket strip through the exit, a sprocket-wheel revolubly mounted on said shaft, instrumentalities actuated by said sprocket-wheel for rotating said drum intermittently, a chain engaging said sprocket-wheel for rotating same, severing means normally closing the exit and connected to said chain, a reciprocatory member, a sprocket-wheel rotatably secured to said member for causing said chain to travel forwardly, means for automatically returning said chain to its initial position, and means for locking said member.

50. A machine of the character described having an exit for tickets from a ticket strip and comprising in combination, a shaft, a drum revoluble thereon and having means for feeding the ticket strip through the exit, a sprocket-wheel revolubly mounted on said shaft, instrumentalities actuated by said sprocket-wheel for rotating said drum intermittently, a chain engaging said sprocket-wheel for rotating same, severing means normally closing the exit and connected to said chain, a reciprocatory member, a sprocket-wheel rotatably secured to said member for causing said chain to travel forwardly, means for automatically returning said chain to its initial position, means for locking said member, and means carried by said member for holding said chain in engagement with said last-mentioned sprocket-wheel.

51. A machine of the character described having an exit for tickets from a perforated ticket strip and comprising in combination, a shaft, a drum revoluble thereon and having means for feeding the ticket strip through the exit, means for rotating said drum intermittently, means for holding the ticket strip in engagement with said drum, and auxiliary means for holding the last ticket wholly in the machine when the one in advance of same is fed through the exit.

52. A machine of the character described having an exit for tickets from a perforated ticket strip and comprising in combination, a shaft, a drum revoluble thereon and having means for feeding the ticket strip through the exit, means for rotating said drum intermittently, means for holding the ticket strip in engagement with said drum, auxiliary means for holding the last ticket wholly in the machine when the one in advance of same is fed through the exit, and means for automatically locking said drum when the last ticket is fed through the exit.

53. In a machine of the character described, the combination of a casing having an exit in its top for tickets from a ticket strip, a rotatable drum having means for feeding the ticket strip through the exit, means for rotating said drum intermittently, a pair of pivoted members having slots therein, a rod extending through said slots, rollers revolubly mounted on said rod, and a spring holding said rollers in engagement with the ticket strip, thereby to hold same in engagement with said drum.

54. In a machine of the character described, the combination of a casing having an exit in its top for tickets from a ticket strip, a rotatable drum having means for feeding the ticket strip through the exit, means for rotating said drum intermittently, a pair of pivoted plates having slots therein, a rod extending through said slots, rollers revolubly mounted on said rod, a spring holding said rollers in engagement with the ticket strip, thereby to hold same in engagement with said drum, there being an opening in the top of said casing to allow said plates to be removed, and a cover for said opening adapted to hold said plates in place.

55. In a machine of the character described, the combination of a casing having an exit for tickets from a ticket strip, a rotatable drum having means for feeding the ticket strip through the exit, means for rotating said drum intermittently, said drum having a plurality of slots in its periphery, a pivoted member, and means for holding said member in engagement with the ticket strip on said drum, said member being adapted to enter a slot in said drum when the last ticket passes through the exit, thereby to lock said drum.

56. In a machine of the character described, the combination of a shaft, a drum revoluble thereon and having means for feeding a ticket strip, a ratchet-wheel revolubly mounted on said shaft, a pawl carried by said drum, a spring holding said pawl in engagement with said ratchet-wheel, means for imparting rotary reciprocatory motion to said ratchet-wheel, and means for preventing said pawl from disengaging said ratchet-wheel during the forward movement of same.

57. In a machine of the character described, the combination of a shaft, a drum revoluble thereon and having means for feeding a ticket strip, a ratchet-wheel revolubly mounted on said shaft, a ring-shaped member surrounding said ratchet-wheel and having notches in its inner edge, a pawl carried by said drum and bearing a shoulder that normally seats in a notch in said member, and means for automatically drawing and holding said pawl into operative engagement with said ratchet-wheel, when same is rotated forwardly, and means for imparting rotary reciprocatory movement to said ratchet-wheel, said member being adapted to prevent said pawl from disengaging said ratchet-wheel during the forward movement of same.

58. In a machine of the character described, the combination of a shaft, a drum revoluble thereon and having means for feeding a ticket strip, a ratchet-wheel revolubly mounted on said shaft, a ring-shaped member surrounding said ratchet-wheel and having arcuated slots concentric to said shaft, a support, studs projecting from said support into the slots in said member, said member having notches in its inner edge, a pawl carried by said drum and bearing a shoulder, a spring holding said member in position to allow the shoulder of said pawl to seat normally in a notch in said member, means for automatically moving and holding said pawl into operative engagement with said ratchet-wheel during the forward movement of same, and means for imparting rotary reciprocatory movement to said ratchet-wheel, said member being adapted to prevent said pawl from disengaging said ratchet-wheel during the forward movement of same.

59. A machine of the character described having an exit for tickets from a ticket strip, a drum having means for feeding the ticket strip through the exit, means for rotating said drum intermittently, thereby to feed one ticket normally through the exit each time said drum is rotated, a depressible member, and means actuated by said member for allowing said drum to rotate sufficiently to feed a plurality of tickets through the exit when said member is depressed.

60. A machine of the character described having an exit for tickets from a ticket strip, a drum having means for feeding the ticket strip through the exit, means for rotating said drum intermittently, thereby to feed one ticket normally through the exit each time said drum is rotated, a plurality of depressible members, and means actuated by said members for allowing said drum to rotate sufficiently to feed a predetermined number of tickets through the exit when any one of said members is depressed.

61. A machine of the character described having an exit for tickets from a ticket strip and comprising in combination; a slotted rotatable drum provided with means adapted to engage said ticket strip for feeding same through the exit, means for rotating said drum intermittently, and a pawl arranged to engage a slot in said drum when the last ticket of the ticket strip is fed through the exit to lock said drum against subsequent rotation.

62. A machine of the character described having an exit for tickets from a ticket strip and comprising in combination, a rotatable drum provided with means adapted to engage said ticket strip for feeding same through the exit, a knife for severing the issued tickets from the ticket strip in the machine and normally closing the exit, means for rotating said drum and adapted to move said knife away from the exit, means for returning said knife to its normal position, and a pawl associated with said knife and engaged with said drum for preventing rotation of the latter until the former uncovers said exit.

63. A machine of the character described having an exit for tickets from a ticket strip and comprising in combination, a rotatable drum provided with means adapted to engage said ticket strip for feeding same through the exit, a knife for severing the issued tickets from the ticket strip in the machine and normally closing the exit, said knife having a cut-away part, means for rotating said drum and adapted to move said knife away from the exit, means for returning said knife to its normal position, and a cornered pawl associated with said knife and engaged with said drum for preventing rotation of the drum until the knife uncovers the exit and the cut-away part of said knife has reached a position directly opposite the corner on said pawl.

64. A machine of the character described having an exit for tickets from a ticket strip and comprising in combination, a rotatable feeding drum for the ticket strip, a knife for severing the issued tickets from the strip in the machine and normally closing the exit, means for rotating the drum and adapted to move said knife away from said exit, means for returning said knife to its normal position, a ratchet wheel secured to said drum, and a pawl associated with said knife and engaged with said ratchet wheel for preventing rotation of said drum until said knife uncovers said exit.

65. A machine of the character described having an exit for tickets from a ticket strip and comprising in combination, a rotatable feeding drum for the ticket strip, a knife for severing the issued tickets from the strip in the machine and normally closing the exit, said knife having a cut-away part, means for rotating the drum and adapted to move said knife away from said exit, means for returning said knife to its normal position, a ratchet wheel secured to said drum, and a cornered pawl associated with said knife and engaged with said ratchet wheel for preventing rotation of said drum until the knife uncovers the exit and the cut-away part of the knife has reached a position directly opposite the corner on said pawl.

In testimony whereof we hereunto affix our signatures in the presence of two witnesses.

ALBERT J. MEIER.
WILLIAM L. SULLIVAN.

Witnesses:
 ISABELLA M. DUNLOP,
 ARCHER W. RICHARDS.